United States Patent
Chizawa et al.

(10) Patent No.: US 6,613,467 B1
(45) Date of Patent: Sep. 2, 2003

(54) POLYMER ELECTROLYTE FUEL CELLS SYSTEM

(75) Inventors: Hiroshi Chizawa, Yokohama (JP); Yasuji Ogami, Yokohama (JP); Kazuo Saito, Glastonbury, CT (US); Mitsushi Ueno, Yokohama (JP)

(73) Assignee: Kabushiki Kaisha Toshiba, Kawasaki (JP)

( * ) Notice: Subject to any disclaimer, the term of this patent is extended or adjusted under 35 U.S.C. 154(b) by 0 days.

(21) Appl. No.: 09/564,475

(22) Filed: May 3, 2000

Related U.S. Application Data

(63) Continuation of application No. PCT/JP99/04817, filed on Sep. 6, 1999.

(30) Foreign Application Priority Data

Sep. 4, 1998 (JP) ............................................. 10-251124

(51) Int. Cl.[7] .......................... H01M 8/04; H01M 8/10; H01M 8/24; H01M 4/86
(52) U.S. Cl. ............................. 429/26; 429/30; 429/40; 429/42
(58) Field of Search .............................. 429/26, 30, 34, 429/40, 42

(56) References Cited

U.S. PATENT DOCUMENTS

| | | | | |
|---|---|---|---|---|
| 4,973,530 A | * | 11/1990 | Vanderborgh et al. | 429/26 X |
| 5,262,249 A | * | 11/1993 | Beal et al. | 429/26 |
| 5,382,478 A | | 1/1995 | Chow et al. | 429/26 |
| 6,447,941 B1 | * | 9/2002 | Tomimatsu et al. | 429/26 |

FOREIGN PATENT DOCUMENTS

| | | |
|---|---|---|
| JP | 5-190184 | 7/1993 |
| JP | 6-124722 | 5/1994 |
| JP | 6-132038 | 5/1994 |
| JP | 6-251778 | 9/1994 |
| JP | 7-320755 | 12/1995 |
| JP | 8-138705 | 5/1996 |
| JP | 8-273687 | 10/1996 |
| JP | 10-162842 | 6/1998 |
| JP | 10-172586 | 6/1998 |
| JP | 10-172587 | 6/1998 |

OTHER PUBLICATIONS

English Language translations of Japanese documents: 06–132038 (May 1994), 06–124722 (May 1994), 07–320755 (Dec. 1995), 10–162842 (Jun. 1998), and 08–138705 (May 1996), all obtained from the Website of the Japanese Patent Office.*

* cited by examiner

*Primary Examiner*—Stephen Kalafut
(74) *Attorney, Agent, or Firm*—Oblon, Spivak, McClelland, Maier & Neustadt, P.C.

(57) ABSTRACT

A polymer electrolyte fuel cells system wherein a reacted gas that has been passed through a cell stack is enabled to be contacted with an unreacted gas to be passed through the cell stack, thereby carrying out a temperature/humidity exchange for the purpose of preventing the drying of a solid polymer electrolyte membrane. The temperature of the unreacted gas is made lower than the temperature of the reacted gas.

14 Claims, 8 Drawing Sheets

POLYMER ELECTROLYTE FUEL CELLS SYSTEM

CROSS REFERENCE TO RELATED APPLICATIONS

This is a continuation of Application No. PCT/JP99/04817, filed Sep. 6, 1999.

This application is based upon and claims the benefit of priority from the prior Japanese Patent Application No. 10-251124, filed Sep. 4, 1998, the entire contents of which are incorporated herein by reference.

BACKGROUND OF THE INVENTION

This invention relates to a polymer electrolyte fuel cells system which makes use of a solid polymer as an electrolyte, and in particular to a polymer electrolyte fuel cells system having a mechanism for preventing the drying of a solid polymer electrolyte membrane.

A fuel cells system is designed such that a fuel gas such as hydrogen or a reactive gas is rendered to electrochemically react with an oxidizing gas such as air so as to directly convert the chemical energy of the fuel to an electric energy.

This fuel cells system can be classified into various types depending on the kind of electrolyte. As one type of fuel cells system, there is known a polymer electrolyte fuel cells system which makes use of a solid polymer as an electrolyte.

FIG. 1 shows a cross-sectional view of one example of the structure of such a polymer electrolyte fuel cells system.

Referring to FIG. 1, each cell 4 comprises a pair of gas-diffusing electrodes consisting of a fuel electrode (hereinafter, referred to as an anode) 1a and an oxidizing electrode (hereinafter, referred to as a cathode) 1b, and a polymer electrolyte membrane 3 having ion conductivity and gas-separating function which is interposed between the pair of gas-diffusing electrodes with a catalyst layer 2a or 2b (made of Pt for example) being interposed between the solid polymer electrolyte membrane 3 and each of the gas-diffusing electrodes. This cell 4 is capable of generating an electric output through a power generation by an electrochemical reaction between a fuel gas or a reactive gas and an oxidizing gas.

This fuel cells system is constituted by a plurality of cells 4 and a gas-impermeable separator 5 provided with grooves for feeding a reactive gas to each of the electrodes of the cells 4.

According to this fuel cells system, a fuel gas such as hydrogen is fed to the anode 1a, while an oxidizing gas such as air is fed to the cathode 1b so as to allow an electrochemical reaction to take place, thereby generating an electromotive force at each cell 4. This electromotive force of each cell 4 is as low as about 1V at most. Therefore, in order to obtain a high output, a cell stack comprising a laminate body of a plurality of cells 4 is put to practical use as a fuel cells system.

Since the electrochemical reaction in this fuel cells system is exothermic reaction, heat is caused to generate. For the purpose of removing this superfluous heat, a cooling plate 7 allowing a cooling medium to pass therethrough is disposed beside every cell laminate body 6 comprising a plurality of cells 4 which are laminated with a separator 5 being interposed between neighboring cells.

Further, if the fuel gas leaks outside the system, not only the utilization of fuel gas is deteriorated, but also there is a danger of explosion by the fuel gas. Therefore, a gas seal is applied, by making use of a sealing material 8, to a space between the solid polymer electrolyte membrane 3 and the gas-impermeable separator 5.

Additionally, at the location of the cathode 1b, water is generated due to an electrode reaction. When this water is condensed at the electrode reaction site, the diffusion of gas is badly affected. Therefore, the water thus produced is required to be discharged together with unreacted gas outside the cell.

On the other hand, as for the material for the solid polymer electrolyte membrane 3, a perfluorosulfonate film which is a fluorinated ion-exchange membrane is known. This solid polymer electrolyte membrane 3 contains an exchange group or hydrogen ion in its molecule and hence, functions as an ion conductive material when it is saturated with water.

However, once this solid polymer electrolyte membrane 3 is dried on the contrary, the ion conductivity thereof is lowered, thus prominently deteriorating the performance of cell. Therefore, there have been taken various measures to prevent the drying of the solid polymer electrolyte membrane 3.

For example, there is known a method wherein a humidifier constructed to allow water and a reactive gas to pass therethrough is disposed on both sides of a steam-permeating film such as the solid polymer electrolyte membrane 3 so as to allow the reactive gas to be wetted before it is fed to the solid polymer electrolyte membrane 3.

In this case, the humidifier is generally formed integral with the cell stack. Further, it is also known that if a reactive gas to be fed to the anode 1a and cathode 1b is allowed to flow to face each other and at the same time, the operation temperature is controlled to not more than 60° C. so as to increase the relative humidity of the reactive gas, the generation of power can be achieved without necessitating to humidify the reactive gas.

On the other hand, as shown in Japanese Patent Unexamined Publication H6-132038, there has been also proposed a method of humidifying unreactive gas by introducing both reacted gas and unreacted gas into a gas chamber partitioned by means of a steam permeating film.

In this case, since water vapor is caused to generate on the cathode side 1b due to an electrode reaction, the reacted gas is rendered to contain saturated or nearly saturated water vapor.

On the other hand, since the quantity of water vapor contained in the unreacted gas is relatively small, a difference in partial pressure of water vapor is caused to generate between the reacted and unreacted gases, so that this difference in partial pressure of water vapor can be utilized as a driving force for effecting the concentration diffusion of water vapor.

Further, as shown in Japanese Patent Unexamined Publication H8-273687, there is also proposed to use a hollow fiber as a water vapor-permeating film, wherein unreacted gas is fed through the interior of the hollow fiber and the reacted gas is fed through the exterior of the hollow fiber, thereby humidifying the reactive gas.

Since the contact area between the reacted gas and the unreacted gas can be increased due to the employment of this hollow fiber, it becomes possible to provide a compact humidifier having a high humidification efficiency. Moreover, since a hollow fiber is employed, it becomes possible to incorporate the humidifier inside the gas manifold of the cell stack.

However, these conventional polymer electrolyte fuel cells systems as mentioned above are accompanied with various problems that when the reactive gas is to be humidified by means of a humidifier or through a humidity exchange, the resultant system becomes inevitably sophisticated and difficult to make it compact, and also may raise various problems when it is used in a low temperature environment such as an air atmosphere of 0° C. or less.

In the case of the humidifier having a structure wherein water and reactive gas are allowed to flow along both sides of a water vapor-permeating film, the freezing of water passageway may be caused to generate when an external temperature is lowered, thus possibly inviting the closing of the passageway, the fracturing of the water vapor-permeating film due to the expansion in volume of ice, and the deformation of the separator 5.

On the other hand, if a non-humidifying operation is to be performed without employing a humidifier, it may become difficult to ensure the long term stability of the solid polymer electrolyte membrane 3 and of the cell performance. In addition to this problem, when the fuel cell is operated at a temperature of not more than 60° C. which is lower than the ordinary operating temperature of 70 to 90° C. by making use of a fuel gas containing CO as in the case of a reformed gas, the catalyst in the anode 1a is badly affected by this CO, thus resulting in the promotion of anodic polarization and hence, badly deteriorating the cell performance.

In the case of humidifying the reactive gas by respectively introducing reacted gas and unreacted gas into a gas chamber which is partitioned by means of a water vapor-permeating film, the transfer of water is effected only through a difference in partial pressure between these gases. Therefore, it has been impossible to obtain a sufficient degree of humidification because of a very large magnitude of diffusion resistance of water vapor such as the resistance to diffusion due to the concentration gradient of water vapor on the reacted gas side, the resistance to diffusion inside the water vapor-permeating film, and the resistance to diffusion on the unreacted gas side.

Further, there is also a problem as the cell stack and the humidifier are separately disposed that part of water vapor in the reacted gas is caused to condense in a midway of the tubing for introducing a reacted gas discharged from the cell stack into the humidifier, thereby decreasing the partial pressure of water vapor of the reacted gas to be fed to the humidifier, thus further deteriorating the humidifying efficiency.

When a hollow fiber is employed as a water vapor-permeating film on the other hand, since the transfer of water is effected only through a difference in partial pressure between the reacted gas and the unreacted gas, it has been impossible to obtain a sufficient degree of humidification though the contact area between the reacted gas and the unreacted gas can be increased. Further, if water vapor is condensed inside the hollow fiber to generate liquid water, the discharging of liquid water from the hollow fiber by means of a gas pressure would become difficult due to the capillary force, thus increasing the pressure loss of the gas and hence, deteriorating the efficiency of the system as a whole.

BRIEF SUMMARY OF THE INVENTION

Therefore, an object of the present invention is to provide a polymer electrolyte fuel cells system which makes it possible to circulate water generated at an oxidizing electrode within the cell without sacrificing not only the property of cell but also the simplification and compactness of the system, thereby preventing a solid polymer electrolyte membrane from being dried, and which is excellent in performance and in compactness and capable of reliably actuating the cell system within a short time even if the ambient temperature is as low as not more than 0° C.

With a view to achieve the aforementioned object, this invention provides a polymer electrolyte fuel cells system comprising a main cell body composed of a cell stack constituted by a laminated body of a plurality of cells each having a solid polymer electrolyte membrane, which is featured in that:

the main cell body is provided with temperature/humidity exchange means which enables a reacted gas passed through the cell stack to be contacted, through a water retentive-porous body, with an unreacted gas prior to a passage of the unreacted gas through the cell stack; and that the temperature of the unreacted gas is controlled lower than the temperature of the reacted gas.

According to this invention as explained above, the unreacted gas of lower temperature is allowed to contact face-to-face with the reacted gas of higher temperature so as to produce the condensation of water vapor contained in the reacted gas in the interior of the water retentive-porous body, thereby allowing water to permeate close to an interface contacting with the unreacted gas due to an osmotic pressure of the interior of the porous body. Accordingly, a difference in partial pressure of water vapor at the interface contacting with the unreacted gas is caused to increase, thus making it possible to greatly decrease the diffusion resistance of water vapor on the occasion when the water vapor inside the reacted gas is transferred, via the porous body, to the unreacted gas through a temperature/humidity exchange.

According to this invention, there is further provided a polymer electrolyte fuel cells system comprising a main cell body composed of a cell stack constituted by a laminated body of a plurality of cells each having a solid polymer electrolyte membrane, the cells being laminated with a separator and a cooling plate being selectively interposed therebetween, which is featured in that:

the separator is provided with gas-feeding means which enables reactive gases from two lines to flow in a manner to face each other; and that the cooling plate is provided with a coolant flow groove, the coolant upstream side of the flow groove being disposed at a gate portion of the reactive gases of the two lines in the separator.

According to this invention, there is further provided a polymer electrolyte fuel cells system comprising a main cell body composed of a cell stack constituted by a laminated body of a plurality of cells each having a solid polymer electrolyte membrane, the cells being laminated with a separator and a cooling plate being selectively interposed therebetween, which is featured in that:

the separator is provided with gas-feeding means which enables reactive gases from two lines to flow in a manner to face each other; and that the cooling plate is provided with coolant flow grooves, intervals between which located at a gate portion of the reactive gases of the two lines in the separator are made narrower than intervals between the coolant flow grooves that are located other than the inlet or outlet portion of the reactive gases of the two lines in the separator.

According to this invention, there is further provided a polymer electrolyte fuel cells system comprising a main cell body composed of a cell stack constituted by a laminated body of a plurality of cells each having a solid polymer electrolyte membrane, the cells being laminated with a separator and a cooling plate being selectively interposed therebetween, which is featured in that:

the separator is provided with;

gas-feeding means which enables reactive gases from two lines to flow in a manner to face each other; and with cooling means for radiating heat to outer atmosphere, the cooling means being located at a gate portion of the reactive gases of the two lines in the separator.

According to this invention as explained above, since the cooling efficiency becomes higher at a downstream portion of reactive gas where the partial pressure of water vapor is made higher due to water generated by the electrode reaction at the oxidizing electrode as well as due to the consumption of reactive gas, the downstream portion of the reactive gas becomes oversaturated with water vapor, thus causing the condensation of water to occur. The water thus condensed at the portion of the fuel electrode or the oxidizing electrode which is located at the downstream portion of the reactive gas is allowed to permeate into and evaporate from the upstream portion of the reactive gas at the oxidizing electrode or fuel electrode (both electrodes facing each other with a solid polymer film being interposed therebetween) where the partial pressure of water vapor is relatively low. As a result, the partial pressure of water vapor at the upstream portion of the reactive gas can be increased.

According to this invention, there is further provided a polymer electrolyte fuel cells system comprising a main cell body composed of a cell stack constituted by a laminated body comprising a plurality of cells each having a pair of gas diffusion electrodes consisting of a fuel electrode and an oxidizing electrode, and a solid polymer electrolyte membrane, the cells being laminated with a separator and a cooling plate being selectively interposed therebetween, which is featured in that:

the separator is provided with gas-feeding means which enables reactive gases from two lines to flow in a manner to face each other; and a downstream portion, in relative to reactive gas flow, of the gas diffusion electrodes is hydrophilized.

Although the gas diffusion layer is generally made hydrophobic for the purpose of preventing the occurrence of a gas diffusion failure due to water originating from a partial condensation of water vapor in the reactive gas, a downstream portion, in relative to reactive gas flow, of the gas diffusion electrodes is hydrophilized according to this invention as explained above so as to trap the condensed water by this downstream portion, in relative to reactive gas flow, of the gas diffusion electrodes without allowing the condensed water to be discharged. Namely, the water thus trapped by this downstream portion, in relative to reactive gas flow, of the fuel electrode or the oxidizing electrode is then allowed to permeate into an upstream portion of the reactive gas where the partial pressure of water vapor is relatively low in the fuel electrode or the oxidizing electrode, which are faced each other with a solid polymer electrolyte membrane being interposed therebetween, the permeated water being subsequently evaporated. As a result, the partial pressure of water vapor at the upstream portion of the reactive gas can be increased.

According to this invention, there is further provided a polymer electrolyte fuel cells system comprising a main cell body composed of a cell stack constituted by a laminated body comprising a plurality of cells each having a pair of gas diffusion electrodes consisting of a fuel electrode and an oxidizing electrode, and a solid polymer electrolyte membrane, the cells being laminated with a separator and a cooling plate being selectively interposed therebetween, which is featured in that:

the separator is provided with gas-feeding means which enables reactive gases from two lines to flow in a manner to face each other; and the entire passageway of reactive gas in the pair of gas diffusion electrodes excluding a downstream portion of the passageways is provided with a catalyst layer.

According to this invention as explained above, since the catalyst is not attached to a downstream portion of reactive gas where the partial pressure of water vapor is made higher due to water generated by the electrode reaction at the oxidizing electrode as well as due to the consumption of reactive gas, there is no possibility of generating a reaction heat originating from the electrode reaction at this downstream portion of reactive gas, thus enabling to maintain a low temperature of this downstream portion of reactive gas. As a result, the reactive gas can be cooled at the portions of electrodes which are located at this downstream portion of reactive gas, and hence, water vapor becomes oversaturated, thus causing the condensation of water. The water thus condensed at the portion of the fuel electrode or the oxidizing electrode which is located at the downstream portion of the reactive gas is allowed to permeate into and evaporate from the upstream portion of the reactive gas at the oxidizing electrode or fuel electrode (both electrodes facing each other with a solid polymer film being interposed therebetween) where the partial pressure of water vapor is relatively low. As a result, the partial pressure of water vapor at the upstream portion of the reactive gas can be increased.

According to this invention, there is further provided a polymer electrolyte fuel cells system comprising a main cell body composed of a cell stack constituted by a laminated body of a plurality of cells each having a solid polymer electrolyte membrane, which is featured in that:

the main cell body is provided with temperature/humidity exchange means which enables a reacted gas passed through the cell stack to be contacted, through a water retentive-porous body, with an unreacted gas to be passed through the cell stack; and with means for condensing water vapor contained in the reacted gas, the means being attached to the porous body.

According to this invention as explained above, since water contained in the reacted gas can be removed, it is possible to prevent water from being kept remained in the discharge line of the reacted gas. At the same time, if the air inside a vehicle is employed as air of low temperature, the air can be utilized for heating the interior of the vehicle during a winter season, thus enhancing the efficiency of the system. Moreover, the condensed water can be utilized for the steam modification of a fuel modifier.

Therefore, it is now possible according to the present invention to circulate water generated at an oxidizing electrode within the cell without sacrificing not only the property of cell but also the simplification and compactness of the system, thereby preventing a solid polymer electrolyte membrane from being dried even if the quantity of water vapor in the reactive gas to be fed is small in a non-humidifying operation. Additionally, it is possible to provide a polymer electrolyte fuel cells system which is excellent in performance and in compactness and capable of reliably actuating the cell system within a short time even if the ambient temperature is as low as not more than 0° C.

Additional objects and advantages of the invention will be set forth in the description which follows, and in part will be obvious from the description, or may be learned by practice of the invention. The objects and advantages of the invention may be realized and obtained by means of the instrumentalities and combinations particularly pointed out hereinafter.

BRIEF DESCRIPTION OF THE SEVERAL VIEWS OF THE DRAWING

The accompanying drawings, which are incorporated in and constitute a part of the specification, illustrate presently preferred embodiments of the invention, and together with the general description given above and the detailed description of the preferred embodiments given below, serve to explain the principles of the invention.

FIGS. 2A and 2B show respectively a first embodiment of the polymer electrolyte fuel cells system according to this invention; wherein FIG. 2A is a schematic view thereof, and FIG. 2B is an exploded view thereof;

DETAILED DESCRIPTION OF THE INVENTION

Various embodiments of this invention will be explained in details with reference to the drawings as follows.

A First Embodiment

Figure 1:
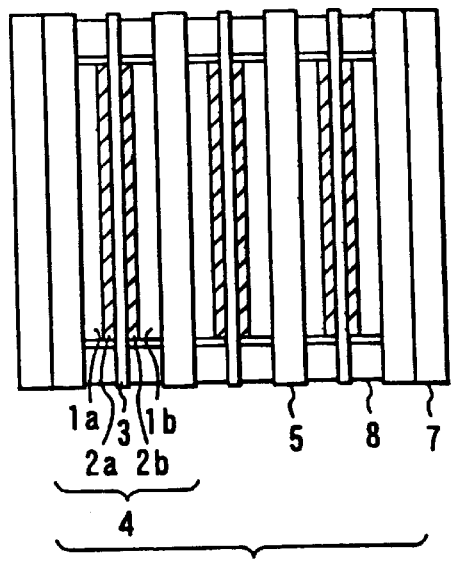
FIG. 1 is a cross-sectional view showing an example of a polymer electrolyte fuel cells system according to the prior art.
Figure 2A:
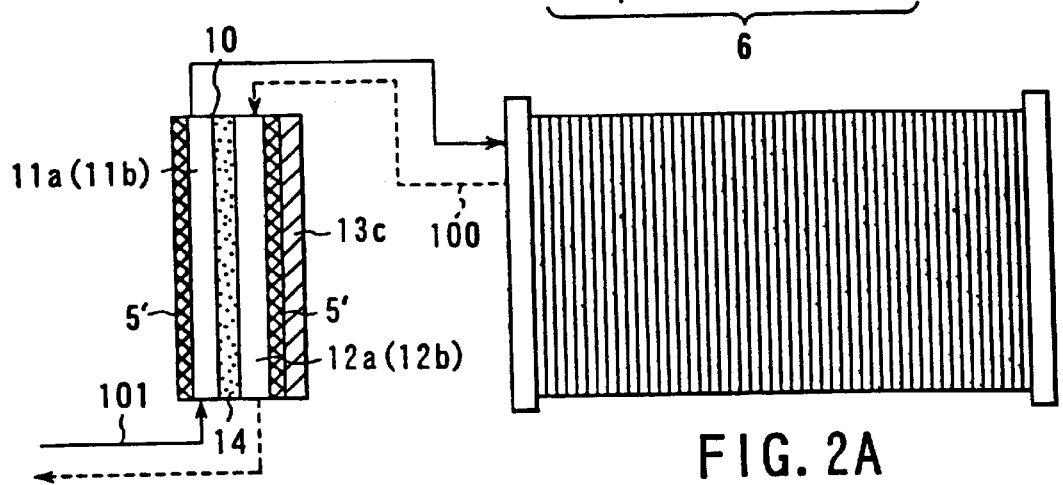
Figure 2B:
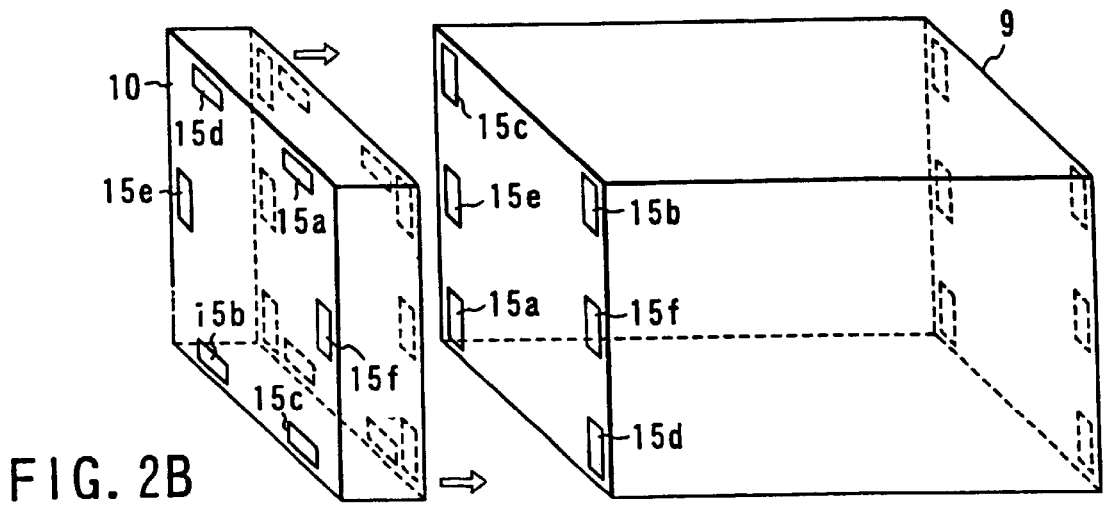
Figure 3A:
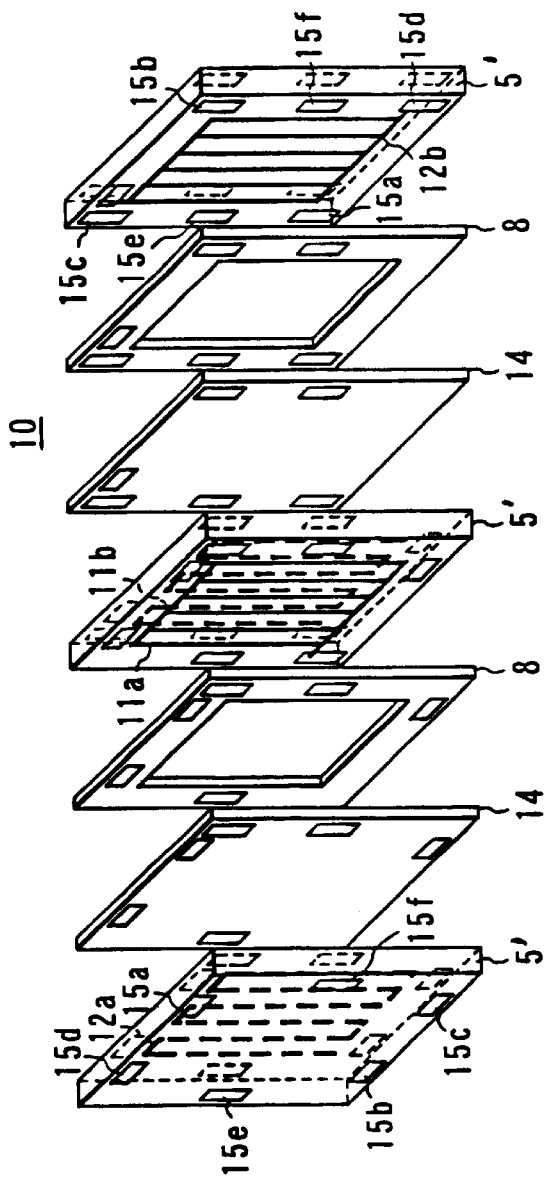
FIGS. 3A and 3B show respectively an exploded perspective view showing a humidity-exchanging portion in the polymer electrolyte fuel cells system according to a first embodiment of this invention.
Figure 3B:
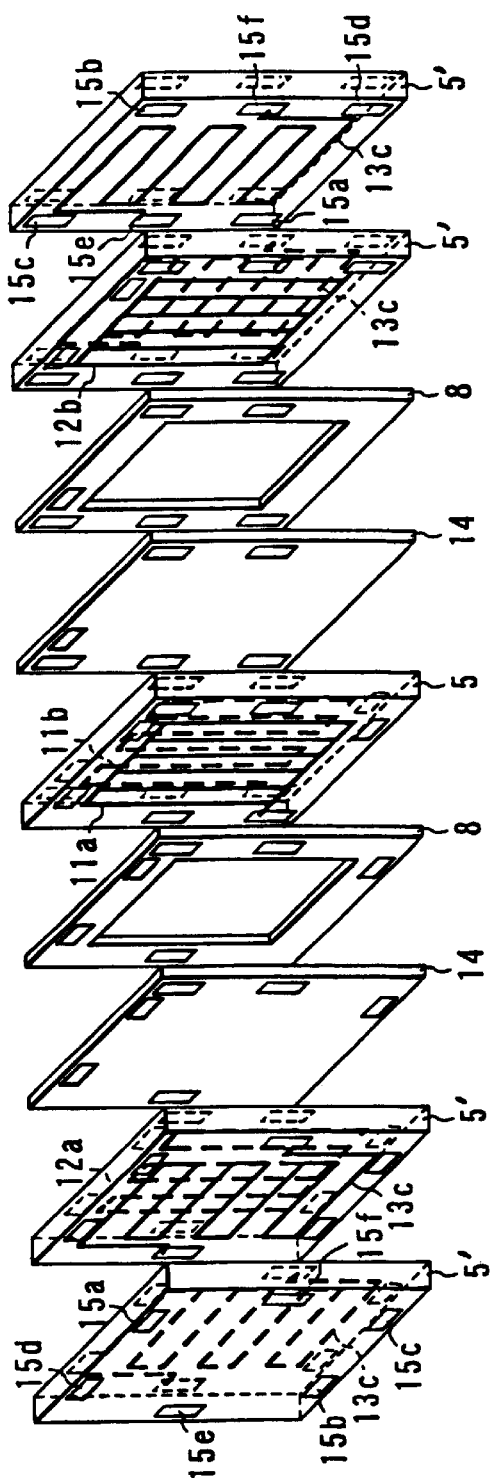

FIG. 2A shows a schematic view illustrating the principle of humidity exchange of the humidity exchange section of the polymer electrolyte fuel cells system according to this invention; FIG. 2B is an exploded view illustrating the structures of the cell stack and humidity exchange section of the polymer electrolyte fuel cells system according to the embodiment shown in FIG. 2A; and FIGS. 3A and 3B show respectively an exploded perspective view showing the aforementioned humidity-exchanging portion in the polymer electrolyte fuel cells system. In these FIGURES. the same portions or members as those of FIG. 1 are represented by the same reference numerals, thereby omitting the illustration thereof. Therefore, only the portions or members which differ from those of FIG. 1 will be mainly explained hereinafter.

Referring to FIG. 2A, the polymer electrolyte fuel cells system according to this embodiment comprises a cell stack 9 and a temperature/humidity exchange portion 10. In this case, a reacted gas (gas that has been already subjected to a reaction) 100 of high temperature that has been discharged from the cell stack 9 is guided to temperature/humidity exchange portion 10 and allowed to pass through gas grooves 12 (12a and 12b) so as to be contacted through a porous body 14 with an unreacted gas 101 of low temperature. As a result, the water vapor contained in the reacted gas 100 is caused to condense in the porous body 14, the resultant condensed water being allowed to permeate to the unreacted gas 101 side. The water thus permeated is then caused to evaporate due to a difference in partial pressure, thus humidifying the unreacted gas 101. In this case, the temperature/humidity exchange portion 10 may be disposed so as to be contacted with or spaced away from the cell stack 9. In FIG. 2A, the temperature/humidity exchange portion 10 is shown as disposed away from the cell stack 9 for the convenience of explanation. As a matter of fact however, in this embodiment, the temperature/humidity exchange portion 10 is actually disposed to contact with the cell stack 9.

In FIG. 2B, the polymer electrolyte fuel cells system is designed such that the temperature/humidity exchange portion 10 is disposed to contact with the cell stack 9, thus integrating the temperature/humidity exchange portion 10 with the cell stack 9.

As shown in FIG. 3A, the temperature/humidity exchange portion 10 is composed of a carbon separator 5' provided with gas grooves 11a or 11b for allowing the unreacted gas 101 of the anode 1a or cathode 1b to pass therethrough prior to passing through the cell stack, a carbon separator 5' provided with gas grooves 12a or 12b for allowing the reacted gas 100 of the anode 1a or cathode 1b to pass therethrough after passing through the cell stack, and a water retentive porous body 14 which is sandwiched, through the sealing material 8, between aforementioned separators 5'.

In this embodiment, this water retentive porous body 14 is formed of a hydrophilized non-woven fabric adhered on the surface thereof with a porous membrane having pore diameter of as small as 1 μm or less. It is possible to employ other kinds of material for this porous body 14 such as a hydrophilized carbon plate, a sintered metal sheet, a fluorinated ion-exchange membrane, a composite film comprising a fluorinated porous film laminated with a fibrous polymer material, etc.

What is required for this porous body 14 is that it is capable of holding water condensed from water vapor included in the reacted gas, that the condensed water is allowed to pass through the porous body 14 by the effect of osmotic pressure and then enabled to evaporate due to a difference in partial pressure of water vapor at the interface facing the unreacted gas side, and that the permeability of gases other than water vapor is minimal.

As shown in FIGS. 2B and 3A, the separator 5' is provided with an anode reactive gas inlet manifold 15a, an anode reactive gas outlet manifold 15b, a cathode reactive gas inlet manifold 15c, a cathode reactive gas outlet manifold 15d, a cooling water inlet manifold 15e and a cooling water outlet manifold 15f.

According to the polymer electrolyte fuel cells system of this embodiment which is constructed as explained above, when a temperature/humidity exchange is allowed to take place between the reacted gas 100 and the unreacted gas 101 at the temperature/humidity exchange portion 10, the water vapor that has been contained in the reacted gas 100 of high temperature that has passed through the cell stack 9 is caused to condense by the effect of the unreacted gas 101 of low temperature, thereby causing this condensed water to cover the region of the porous body 14 which contacts with the reacted gas 100. The condensed water is then caused, due to the osmotic pressure in the interior of the porous body 14, to further penetrate into the porous body 14 up to the vicinity of an interface which contacts with the unreacted gas 101. Therefore, the diffusion resistance of water vapor can be greatly minimized at the moment when the water vapor in the reacted gas 100 is subjected via the porous body to a temperature/humidity exchange with the unreacted gas 101.

Further, since the temperature/humidity exchange portion 10 is disposed to contact with the cell stack 9, a tubing that has been conventionally employed for introducing the unreacted gas 101 into the humidifier (not shown) can be omitted. As a result, the system can be made compact and at the same time, the condensation of water vapor in the reacted gas due to a heat radiation at the tubing can be prevented, thus making it possible to prevent the quantity of water vapor in the reacted gas 101 which is to be fed to the temperature/humidity exchange portion 10 from being decreased.

Figure 4:
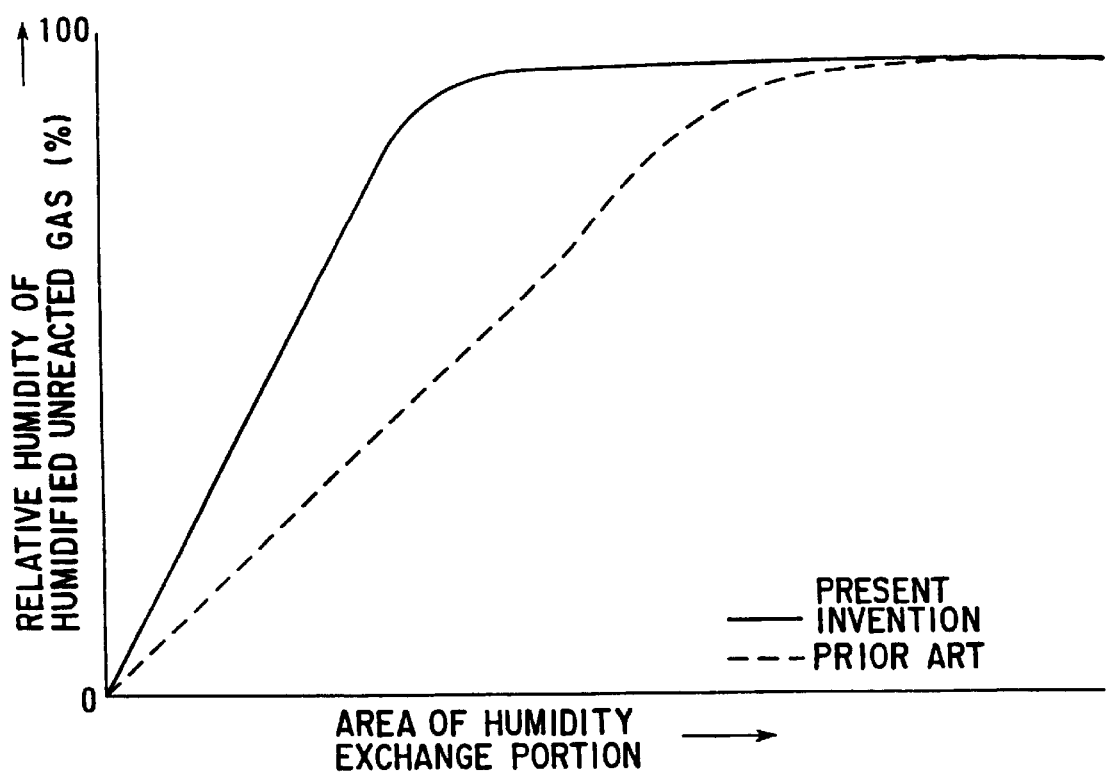
FIG. 4 is a graph for illustrating the effects of the polymer electrolyte fuel cells system according to the first embodiment of this invention.

FIG. 4 is a graph illustrating the relationship between the area of the temperature/humidity exchange portion 10 and the relative humidity of the unreacted gas that has been humidified by the humidity exchange. As shown in FIG. 4, it is possible, on account of the structure of this embodiment, to minimize the diffusion resistance of water vapor at the interface of porous body 14 in the temperature/humidity exchange portion 10 as compared with the conventional humidifying method wherein the permeation of water vapor is effected by way of only the difference in partial pressure of water vapor between the gases, thereby making it possible to greatly increase the humidity exchange efficiency. As a result, the area of the temperature/humidity exchange portion 10 can be decreased, thus making it possible to make the system compact.

A Modified Embodiment 1

It is also possible to provide the temperature/humidity exchange portion 10 with a gas-feeding line so as to cause the reacted gas and the unreacted gas to take a counterflow to each other with the porous body 14 being interposed therebetween, thereby making it possible to make the system further compact.

A Modified Embodiment 2

As shown in FIG. 3B, a groove 13c for flowing a cooling medium therethrough may be provided on the back surface of the separator 5', thereby further promoting the condensation of water vapor in the reacted gas, thus making it possible to further improve the humidity exchange efficiency.

As explained above, according to the polymer electrolyte fuel cells system of this embodiment, the water vapor in the reacted gas is caused to condense inside the water retentive porous body 14. As a result, the humidity exchange efficiency can be improved and at the same time, the fuel cells system can be made more compact.

Additionally, since the reacted gas and the unreacted gas are caused to flow in a counter direction to each other, it is possible to make the system further compact.

Further, since a heat exchange means is disposed close to the temperature/humidity exchange portion 10, the quantity of condensation can be increased and hence, the humidity exchange efficiency can be further improved.

As for the cooling means, it is not limited to that shown in this embodiment, but a cooling passageway for flowing a cooling medium such as an antifreezing fluid may be provided in the vicinity of the porous body 14, thus making it possible to achieve almost the same effect as mentioned above.

Although the conventional system where water is employed for the humidification is accompanied with a problem of the freezing of water, water is not employed for the humidification according to the polymer electrolyte fuel cells system of this embodiment, so that it is possible to obviate the problems such as the freezing of water, and the fracture and deformation of the film due to the freezing thereof. As a result, it is possible to provide a polymer electrolyte fuel cells system which is highly reliable and can be actuated within a short time, since a time for melting of ice is no more needed for starting the system.

A Second Embodiment

Figure 5:
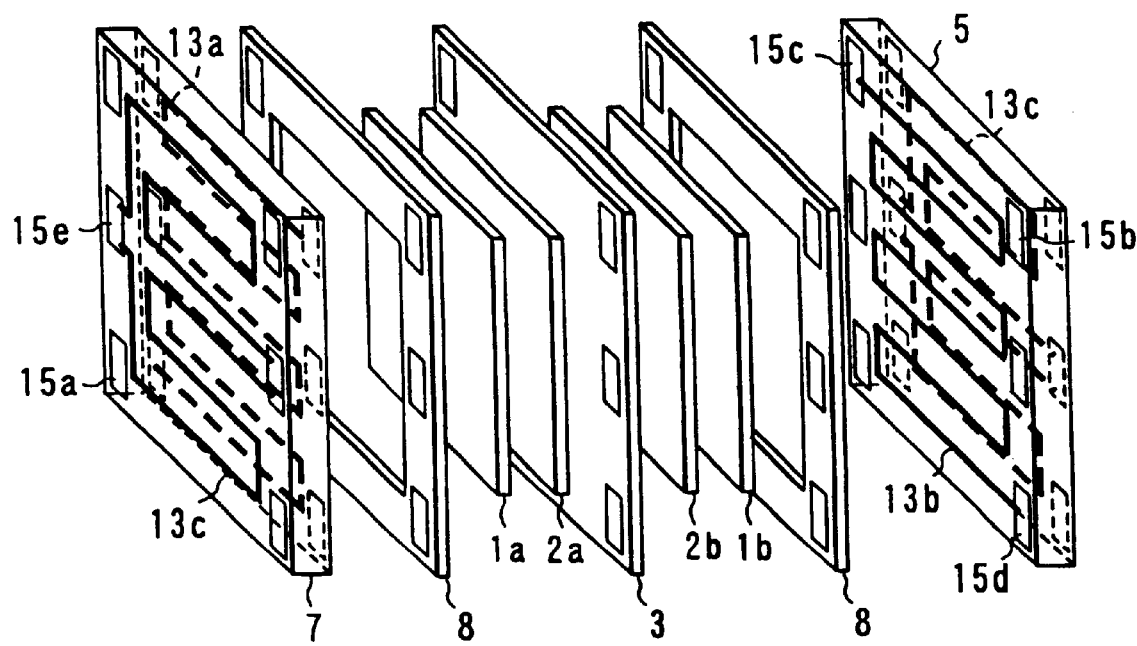
FIG. 5 is an exploded perspective view of the polymer electrolyte fuel cells system according to a second embodiment of this invention.
Figure 6:
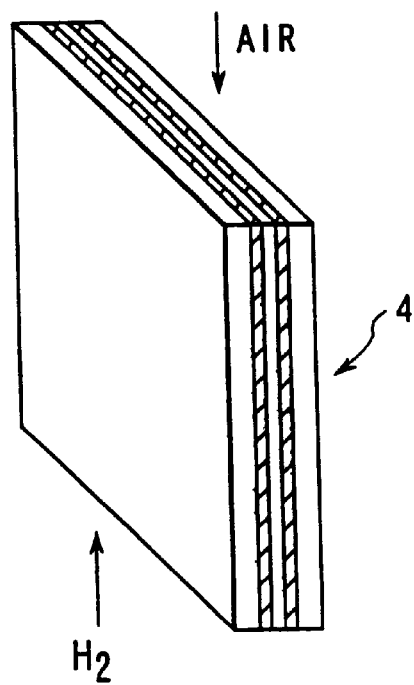
FIG. 6 is a perspective view illustrating the structure of the cells constituting the cell stack in the polymer electrolyte fuel cells system according to a second embodiment of this invention.

FIG. 5 is an exploded perspective view illustrating the structure of the polymer electrolyte fuel cells system according to this embodiment, and FIG. 6 is a perspective view illustrating the structure of the cells constituting the cell stack in the polymer electrolyte fuel cells system of this embodiment. The arrow shown in FIG. 6 indicates the direction of the flow of reactive gas to be fed to the cell.

Referring to FIG. 5, the cell comprises a pair of gas-diffusing electrodes consisting of an anode 1a and a cathode 1b, and a solid polymer electrolyte membrane 3 having ion conductivity and gas-separating function which is interposed between the pair of gas-diffusing electrodes with a catalyst layer 2a or 2b (made of Pt for example) being interposed between the solid polymer electrolyte membrane 3 and each of the gas-diffusing electrodes. This cell 4 is capable of generating an electric output through a power generation by an electrochemical reaction between a fuel gas or a reactive gas and an oxidizing gas.

This cell 4 is sandwiched between a gas-impermeable separator 5 provided with reactive gas grooves 13a and 13b for feeding a reactive gas to each electrode, and a cooling plate 7 provided with a groove 13c for flowing a cooling medium, wherein a sealing material 8 is interposed between the cell 4 and the separator 5 as well as between the cell 4 and the cooling plate 7, thereby forming a laminate body. In this case, a plural number of this laminate body are further laminated one another, and the groove 13c for flowing a cooling medium is arranged in such a manner that the upstream portion of the cooling medium is positioned at the gate portion of each reactive gas.

Further, as shown in FIG. 6, the cell 4 is constructed in such a manner that the flow of reactive gas to be fed to the anode 1a is directed so as to face the flow of reactive gas to be fed to the cathode 1b.

According to the polymer electrolyte fuel cells system of this embodiment which is constructed as explained above, since the inlet of the cooling plate 7 is disposed at a downstream portion of reactive gas where the partial pressure of water vapor is made higher due to water generated by the electrode reaction at the cathode 1b as well as due to the consumption of reactive gas, the cooling efficiency on the downstream portion of reactive gas can be enhanced so that the downstream portion of the reactive gas becomes oversaturated with water vapor, thus causing the condensation of water to occur. The water thus condensed at the portion of the anode 1a or the cathode 1b which is located at the downstream portion of the reactive gas is allowed to permeate into and evaporate from the upstream portion of the reactive gas at the anode 1a or the cathode 1b (both electrodes facing each other with a solid polymer electrolyte membrane 3 being interposed therebetween) where the partial pressure of water vapor is relatively low. As a result, the partial pressure of water vapor at the upstream portion of the reactive gas can be increased.

Additionally, since the inlet of the cooling plate 7 is disposed at a downstream portion of reactive gas, the relative humidity can be increased at the downstream portion of the reactive gas or the condensation of water can be generated. Accordingly, it is possible to increase the quantity of water vapor to be transferred from the downstream portion of reactive gas at the anode 1a or the cathode 1b where the partial pressure of water vapor is relatively high into the upstream portion of reactive gas at the anode 1a or the cathode 1b where the partial pressure of water vapor is relatively low.

By the way, it has been confirmed that when a non-humidified reactive gas was supplied according to the system of this embodiment, it was possible to obtain almost the same cell performance as that of conventional cell at the operation temperature of 80° C. which is higher than the conventional operation temperature by about 25° C. Moreover, since the operation temperature is higher as compared with that of the conventional cell, it was possible to prevent the decrease of voltage by the effect of CO.

As mentioned above, according to the polymer electrolyte fuel cells system of this embodiment, since the partial pressure of water vapor in the reactive gas to be fed to the cell stack can be increased by the presence of the temperature/humidity exchange portion 10 even if a reactive gas of low relative humidity is fed to the cell stack, it is possible to obtain an excellent cell property without requiring to decrease the cell temperature even in the case of a non-humidifying operation.

As a result, the humidifier can be omitted, thus making it possible to make the system compact and to reduce the manufacturing cost. Furthermore, since the cell system can be operated at a higher temperature than the cell temperature on the occasion of feeding a non-humidifying gas according to the prior art, it is possible to inhibit the decrease of voltage by the effect of CO.

A Third Embodiment

Figure 7:
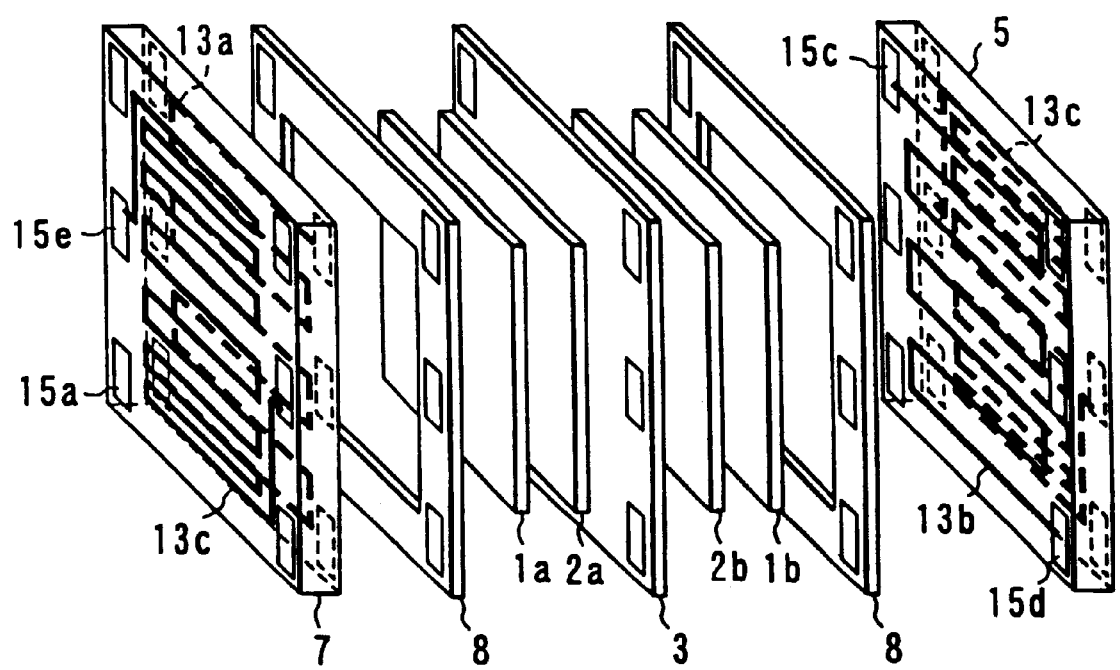
FIG. 7 is an exploded perspective view of the polymer electrolyte fuel cells system according to a third embodiment of this invention.
Figure 8:
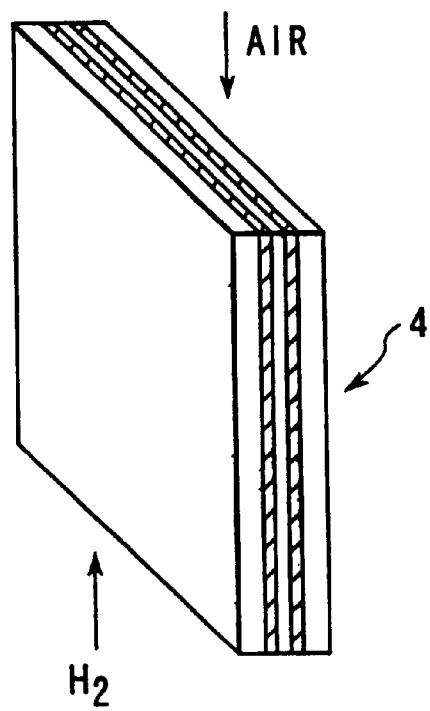
FIG. 8 is a perspective view illustrating the structure of the cells constituting the cell stack in the polymer electrolyte fuel cells system according to a third embodiment of this invention.

FIG. 7 is an exploded perspective view illustrating the structure of the polymer electrolyte fuel cells system according to this embodiment, and FIG. 8 is a perspective view illustrating the structure of the cells constituting the cell stack in the polymer electrolyte fuel cells system of this embodiment. The arrow shown in FIG. 8 indicates the direction of the flow of reactive gas to be fed to the cell.

Referring to FIG. 7, the cell comprises a pair of gas-diffusing electrodes consisting of an anode 1a and a cathode 1b, and a solid polymer electrolyte membrane 3 having ion conductivity and gas-separating function which is interposed between the pair of gas-diffusing electrodes with a catalyst layer 2a or 2b (made of Pt for example) being interposed between the solid polymer electrolyte membrane 3 and each of the gas-diffusing electrodes. This cell 4 is capable of generating an electric output through a power generation by an electrochemical reaction between a fuel gas or a reactive gas and an oxidizing gas.

This cell 4 is sandwiched between a gas-impermeable separator 5 provided with reactive gas grooves 13a and 13b for feeding a reactive gas to each electrode, and a cooling plate 7 provided with a groove 13c for flowing a cooling medium, wherein a sealing material 8 is interposed between the cell 4 and the separator 5 as well as between the cell 4 and the cooling plate 7, thereby forming a laminate body. In this case, a plural number of this laminate body are further laminated one another, and the groove 13c for flowing a cooling medium is constructed in such a manner that the interval between the grooves is relatively narrowed at the gate portion of each reactive gas.

Further, as shown in FIG. 8, the cell 4 is constructed in such a manner that the flow of reactive gas to be fed to the anode 1a is directed so as to face the flow of reactive gas to be fed to the cathode 1b.

According to the polymer electrolyte fuel cells system of this embodiment which is constructed as explained above, almost the same effects and advantages as in the case of the aforementioned second embodiment can be obtained.

A Fourth Embodiment

Figure 9:
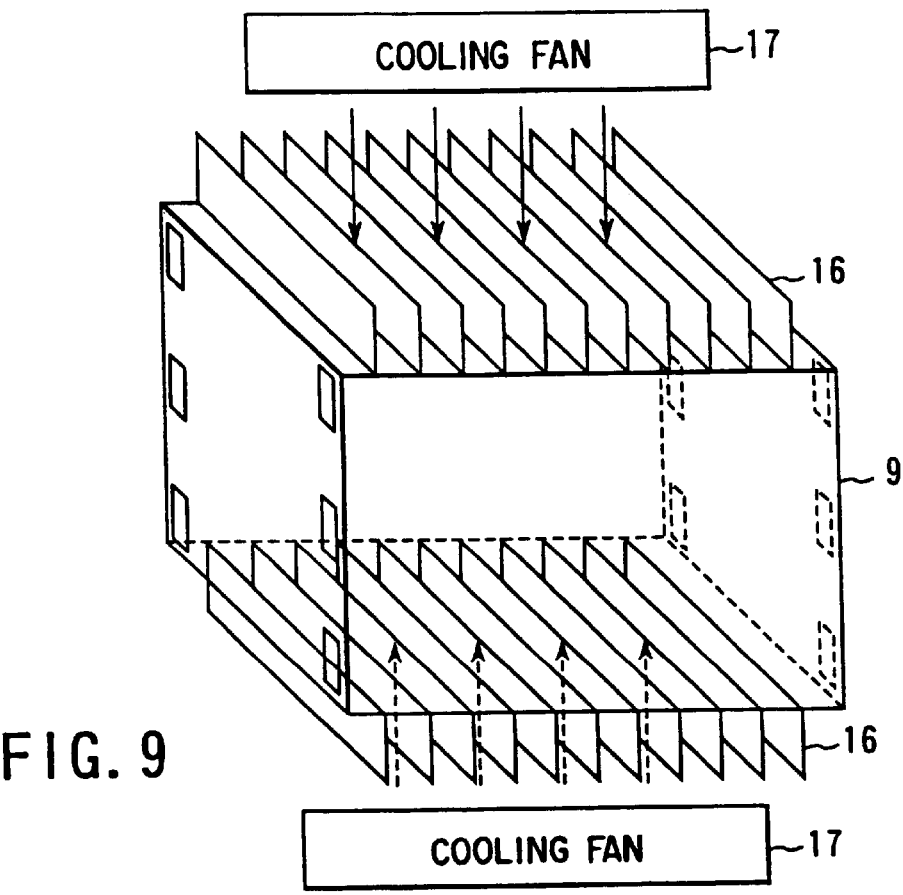
FIG. 9 is a perspective view of the polymer electrolyte fuel cells system according to a fourth embodiment of this invention.
Figure 10:
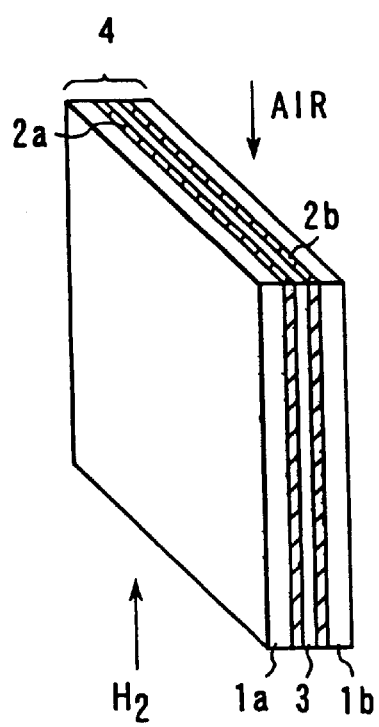
FIG. 10 is a perspective view illustrating the structure of the cells constituting the cell stack in the polymer electrolyte fuel cells system according to a fourth embodiment of this invention.

FIG. 9 is a perspective view illustrating the structure of the cell stack of the polymer electrolyte fuel cells system according to this embodiment. The arrows in FIG. 9 show a flow of air by the effect of a cooling fan. FIG. 10 is a perspective view illustrating the structure of the cells constituting the cell stack in the polymer electrolyte fuel cells system of this embodiment. The arrow shown in FIG. 10 indicates the direction of the flow of reactive gas to be fed to the cell.

Referring to FIG. 9, radiation fins 16 and a cooling fan 17 are attached respectively to the upper surface and bottom surface of the cell stack 9 which is located at the gate portion of the reactive gas so as to forcibly cool the cell stack 9.

Further, as shown in FIG. 10, the cell 4 is constructed in such a manner that the flow of reactive gas to be fed to the anode 1a is directed so as to face the flow of reactive gas to be fed to the cathode 1b.

According to the polymer electrolyte fuel cells system of this embodiment which is constructed as explained above, almost the same effects and advantages as in the case of the aforementioned third embodiment can be obtained.

In particular, when a cooling water is not employed in the cooling of the cell portion, it becomes possible to realize a system where a cooling water is not employed, thus making it possible to improve the handleability of the system.

A Fifth Embodiment

Figure 11:
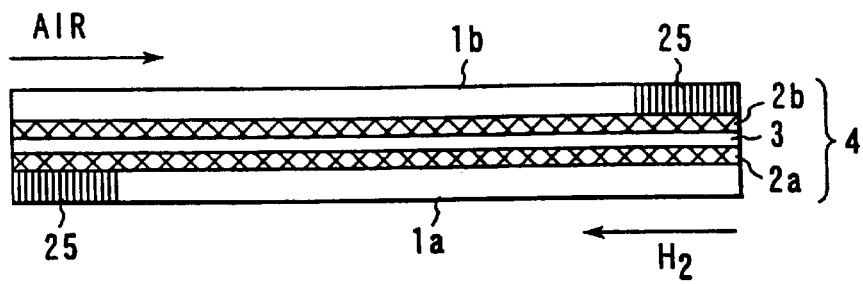
FIG. 11 is a cross-sectional view of the polymer electrolyte fuel cells system according to a fifth embodiment of this invention.

FIG. 11 is a cross-sectional view illustrating the structure of the cells constituting the cell stack in the polymer electrolyte fuel cells system of this embodiment. The arrow shown in FIG. 11 indicates the direction of the flow of reactive gas to be fed to the cell.

Referring to FIG. 11, the cell 4 comprises a pair of gas-diffusing electrodes consisting of an anode 1a and a cathode 1b, and a solid polymer electrolyte membrane 3 having ion conductivity and gas-separating function which is interposed between the pair of gas-diffusing electrodes with a catalyst layer 2a or 2b (made of Pt for example) being interposed between the solid polymer electrolyte membrane 3 and each of the gas-diffusing electrodes. Both anode 1a and cathode 1b of the cell 4 are respectively provided in advance, at a portion thereof corresponding to the downstream portion of the reactive gas, with a hydrophilization portion 25 which is formed of a coating of ink comprising carbon powder (Vulcan XC-72R), a surfactant and pure water (solid matter: 67%), the coating of ink being dried at a temperature of 120° C. after being coated.

In this case, the entire portions of the anode 1a and the cathode 1b other than the hydrophilization portions 25 thereof are made hydrophobic for the purpose of preventing the gas diffusion layer from becoming poor in gas diffusion due to the condensed water.

According to the polymer electrolyte fuel cells system of this embodiment which is constructed as explained above, since an end portion of gas diffusion electrode which corresponds to the downstream portion of the reactive gas is hydrophilized by a coating of ink comprising carbon powder, the condensed water can be trapped by this hydrophilization portion without being discharged. Namely, the water thus trapped at the downstream portion of reactive gas of the anode 1a or the cathode 1b is allowed to penetrate into the upstream portion of the reactive gas at the anode 1a or the cathode 1b (both electrodes facing each other with a solid polymer electrolyte membrane 3 being interposed therebetween) where the partial pressure of water vapor is relatively low, and then, allowed to evaporate therefrom. As a result, the partial pressure of water vapor at the upstream portion of the reactive gas can be increased.

As mentioned above, according to the polymer electrolyte fuel cells system of this embodiment, since the partial pressure of water vapor in the reactive gas to be fed to the cell stack can be increased by the presence of the temperature/humidity exchange portion 10 even if a reactive gas of low relative humidity is fed to the cell stack, it is possible to obtain an excellent cell property without requiring to decrease the cell temperature even in the case of a non-humidifying operation.

As a result, the humidifier can be omitted, thus making it possible to make the system compact and to reduce the manufacturing cost. Furthermore, since the cell system can be operated at a higher temperature than the cell temperature on the occasion of feeding a non-humidifying gas according to the prior art, it is possible to inhibit the decrease of voltage by the effect of CO.

By the way, it is possible, in this embodiment, to employ an ink where a fine powder of SiC, $SiO_2$, $TiO_2$ or $SnO_2$ is substituted for the aforementioned carbon powder, or to employ a solid polymer electrolyte to thereby achieve almost the same effects as mentioned above.

A Sixth Embodiment

Figure 12:
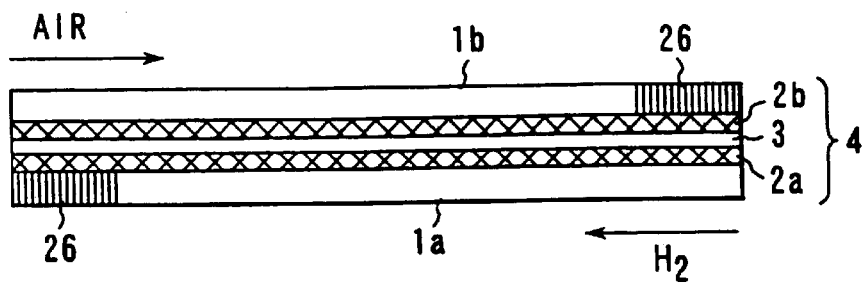
FIG. 12 is a cross-sectional view of the polymer electrolyte fuel cells system according to a sixth embodiment of this invention.

FIG. 12 is a cross-sectional view illustrating the structure of the cells constituting the cell stack in the polymer electrolyte fuel cells system of this embodiment. The arrow shown in FIG. 11 indicates the direction of the flow of reactive gas to be fed to the cell.

Referring to FIG. 12, the cell 4 comprises a pair of gas-diffusing electrodes consisting of an anode 1a and a cathode 1b, and a solid polymer electrolyte membrane 3 having ion conductivity and gas-separating function which is interposed between the pair of gas-diffusing electrodes with a catalyst layer 2a or 2b (made of Pt for example) being interposed between the solid polymer electrolyte membrane 3 and each of the gas-diffusing electrodes. Both anode 1a and cathode 1b of the cell 4 are respectively provided, at a portion thereof corresponding to the downstream portion of the reactive gas, with a polymer electrolyte press-fitted portion 26 which is formed by hot-pressing the solid polymer electrolyte membrane 3 at about glass transition temperature thereof.

According to the polymer electrolyte fuel cells system of this embodiment which is constructed as explained above, since the press-fitted portion of the solid polymer electrolyte membrane 3, i.e. the end portion of the gas diffusion electrode which corresponds to the downstream portion of the reactive gas is hydrophilized, the condensed water can be trapped by this hydrophilization portion without being discharged. Namely, the water thus trapped at the downstream portion of reactive gas of the anode 1a or the cathode 1b is allowed to penetrate into the upstream portion of the reactive gas at the anode 1a or the cathode 1b (both electrodes facing each other with a solid polymer electrolyte membrane 3 being interposed therebetween) where the partial pressure of water vapor is relatively low, and then, allowed to evaporate therefrom. As a result, the partial pressure of water vapor at the upstream portion of the reactive gas can be increased.

As mentioned above, according to the polymer electrolyte fuel cells system of this embodiment, since the partial pressure of water vapor in the reactive gas to be fed to the cell stack can be increased by the presence of the temperature/humidity exchange portion 10 even if a reactive gas of low relative humidity is fed to the cell stack, it is possible to obtain an excellent cell property without requiring to decrease the cell temperature even in the case of a non-humidifying operation.

As a result, the humidifier can be omitted, thus making it possible to make the system compact and to reduce the manufacturing cost. Furthermore, since the cell system can be operated at a higher temperature than the cell temperature on the occasion of feeding a non-humidifying gas according to the prior art, it is possible to inhibit the decrease of voltage by the effect of CO.

A Seventh Embodiment

Figure 13:
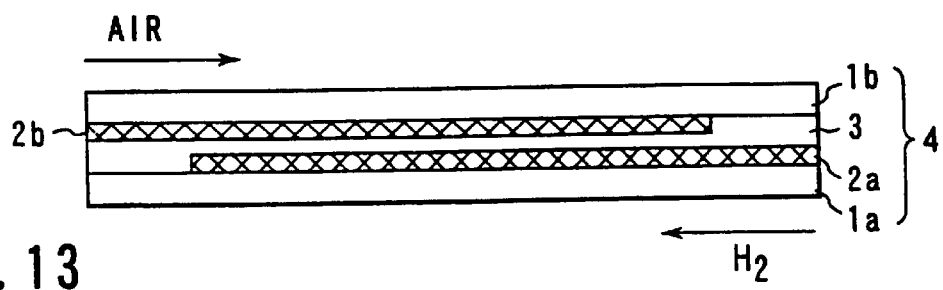
FIG. 13 is a cross-sectional view of the polymer electrolyte fuel cells system according to a seventh embodiment of this invention.

FIG. 13 is a cross-sectional view illustrating the structure of the cells constituting the cell stack in the polymer electrolyte fuel cells system of this embodiment. The arrow shown in FIG. 11 indicates the direction of the flow of reactive gas to be fed to the cell.

Referring to FIG. 13, the cell 4 comprises a pair of gas-diffusing electrodes consisting of an anode 1a and a cathode 1b, and a solid polymer electrolyte membrane 3 having ion conductivity and gas-separating function which is interposed between the pair of gas-diffusing electrodes with a catalyst layer 2a or 2b (made of Pt for example) being interposed between the solid polymer electrolyte membrane 3 and each of the gas-diffusing electrodes. A portion of each of the anode 1a and cathode 1b of the cell 4, which corresponds to the downstream portion of the reactive gas, is not provided with the catalyst layer 2a or 2b.

According to the polymer electrolyte fuel cells system of this embodiment which is constructed as explained above, since the portion corresponding to the downstream portion of the reactive gas where the catalyst layer 2a or 2b is not attached is incapable of generating a reaction heat by the electrode reaction, the temperature of this portion is lower than that of the electrode reaction portion, thereby increasing the relative humidity or the effect of condensing water at this downstream portion of the reactive gas. As a result, the water vapor on the reacted gas side at the downstream portion of the anode 1a or the cathode 1b is caused to condense, and the water thus condensed at the downstream portion of reactive gas of the anode 1a or the cathode 1b is allowed to penetrate into the unreacted gas side of the anode 1a or the cathode 1b (both electrodes facing each other with a solid polymer electrolyte membrane 3 being interposed therebetween). As a result, the water vapor is allowed to diffuse into the unreacted gas side due to a difference in partial pressure of water vapor, thus performing the humidification of the unreacted gas.

Accordingly, it is possible to increase the quantity of water vapor to be transferred from the downstream portion of reactive gas at the anode 1a or the cathode 1b where the partial pressure of water vapor is relatively high into the upstream portion of reactive gas at the anode 1a or the cathode 1b where the partial pressure of water vapor is relatively low.

By the way, it has been confirmed that when a non-humidified reactive gas was supplied according to the system of this embodiment, it was possible to obtain almost the same cell performance as that of conventional cell at the operation temperature of 85° C. which is higher than the conventional operation temperature by about 30° C. Moreover, since the operation temperature is higher as compared with that of the conventional cell, it was possible to prevent the decrease of voltage by the effect of CO.

A Modified Embodiment

Figure 14:
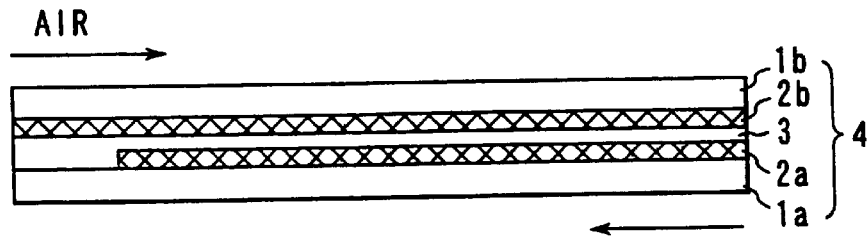
FIG. 14 is a cross-sectional view of the polymer electrolyte fuel cells system according to a modified seventh embodiment of this invention.

As shown in FIG. 14, it is also possible to omit only the catalyst layer 2a which is located in the vicinity of the outlet for the reactive gas of the anode 1a of the cell 4.

As mentioned above, according to the polymer electrolyte fuel cells system of this embodiment, since the partial pressure of water vapor in the reactive gas to be fed to the cell stack can be increased by the presence of the temperature/humidity exchange portion 10 even if a reactive gas of low relative humidity is fed to the cell stack, it is possible to obtain an excellent cell property without requiring to decrease the cell temperature even in the case of a non-humidifying operation.

As a result, the humidifier can be omitted, thus making it possible to make the system compact and to reduce the manufacturing cost. Furthermore, since the cell system can be operated at a higher temperature than the cell temperature on the occasion of feeding a non-humidifying gas according to the prior art, it is possible to inhibit the decrease of voltage by the effect of CO.

A Eighth Embodiment

Figure 15:
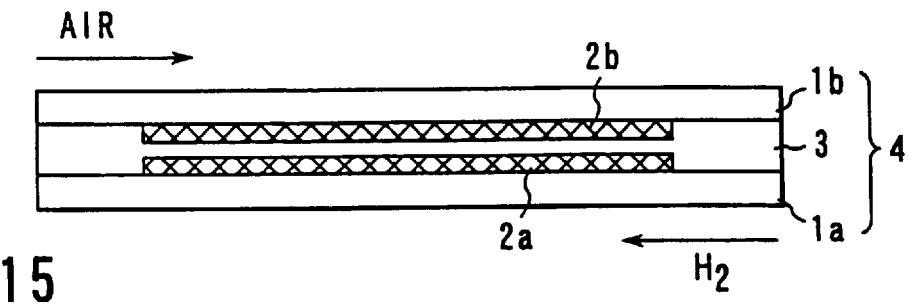
FIG. 15 is a cross-sectional view of the polymer electrolyte fuel cells system according to an eighth embodiment of this invention.

FIG. 15 is a cross-sectional view illustrating the structure of the cells constituting the cell stack in the polymer electrolyte fuel cells system of this embodiment.

Referring to FIG. 15, the cell 4 comprises a pair of gas-diffusing electrodes consisting of an anode 1a and a cathode 1b, and a solid polymer electrolyte membrane 3 having ion conductivity and gas-separating function which is interposed between the pair of gas-diffusing electrodes with a catalyst layer 2a or 2b (made of Pt for example) being interposed between the solid polymer electrolyte membrane 3 and each of the gas-diffusing electrodes. The cell 4 is constructed in such a manner that the flow of reactive gas to be fed to the anode 1a is directed so as to face the flow of reactive gas to be fed to the cathode 1b. A portion of each of the anode 1a and cathode 1b of the cell 4, which is located in the vicinity of the gate of the reactive gas, is not provided with the catalyst layer 2a or 2b.

According to the polymer electrolyte fuel cells system of this embodiment which is constructed as explained above, if the diffusion of gas is poor at the downstream portion of the reactive gas, the supply of proton would be obstructed, thereby giving rise to the generation of erosion.

For example, when a carbon electrode is employed, the erosion would be generated according to the following reaction.

$$C+2H_2O \rightarrow CO_2+4H^++4e^-$$

In this connection, according to the structure of this embodiment, the catalyst layer 2a or 2b is not provided at a portion of each of the anode 1a and cathode 1b which is located in the vicinity of the gate of the reactive gas. As a result, the transfer of proton that has been generated at the anode 1a to the cathode 1b can be obstructed, thus making it possible to prevent the generation of erosion.

By the way, even when the power generation using this embodiment was performed under an operating condition which may cause the deterioration of gas diffusion on the occasion of high load operation or low temperature operation, the erosion of electrodes was not recognized at all.

As explained above, since erosion of electrodes can be prevented according to the polymer electrolyte fuel cells system of this embodiment, the reliability of the cell can be enhanced.

A Modified Embodiment

Figure 16:
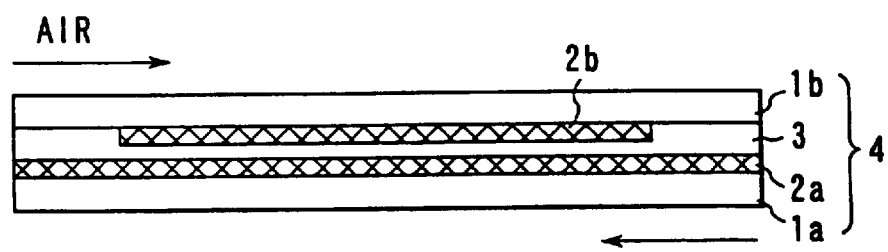
FIG. 16 is a cross-sectional view of the polymer electrolyte fuel cells system according to a modified eighth embodiment of this invention.

As shown in FIG. 16, it is also possible to omit only the catalyst layer 2b which is located in the vicinity of the outlet for the reactive gas of the cathode 1b of the cell 4.

A Ninth Embodiment

Figure 17:
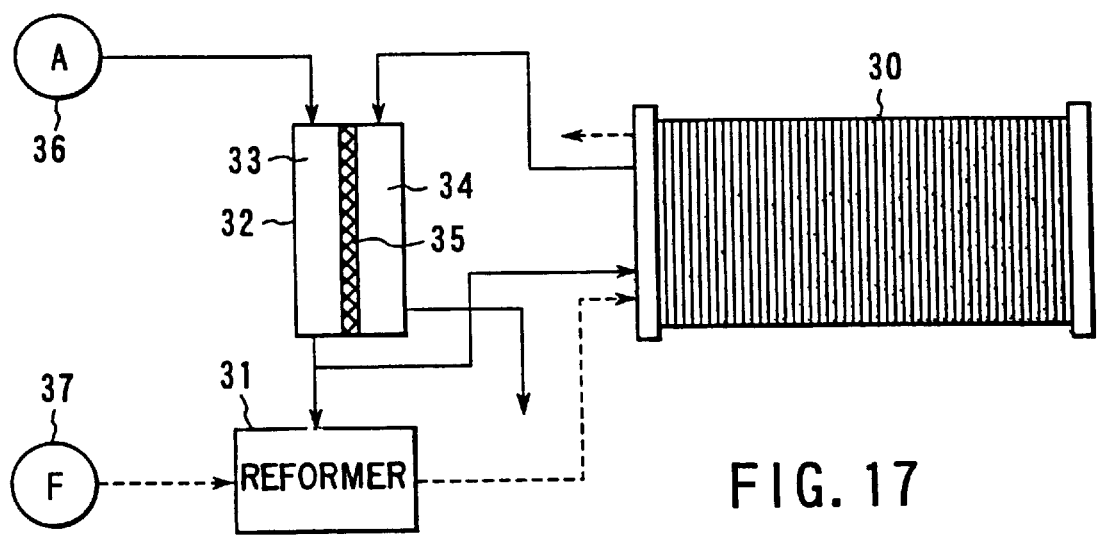
FIG. 17 is a cross-sectional view of the polymer electrolyte fuel cells system according to a ninth embodiment of this invention.

FIG. 17 is a schematic view of the polymer electrolyte fuel cells system according to this embodiment.

The polymer electrolyte fuel cells system according to this embodiment is featured in that it is provided with a humidity exchange portion wherein the reacted gas that has passed through the cell stack is caused to contact, through a water retentive porous body, with air of lower temperature than that of the reacted gas, thereby causing the water vapor contained in the reacted gas to condense inside the water retentive porous body so as to perform a humidity exchange.

Specifically, as shown in FIG. 17, this system comprises a cell stack 30 and a humidity exchange portion 32. In this case, the reacted gas that has been discharged from the cell is allowed to pass through a reacted gas passageway 34 of the humidity exchange portion 32 and then, allowed to contact, via a water retentive porous body 35, with air as the unreacted gas 36 that has been transferred through a unreacted gas passageway 33. As a result, the water vapor is caused to condense in the porous body 35, the water thus condensed being allowed to permeate into the porous body 35 to reach the unreacted gas passageway 33. The condensed water reached the unreacted gas side is then caused to evaporate and diffuse depending on a difference in partial pressure of water vapor. At the same time, part of the water that has failed to evaporate is pushed forward due to the flow of water to a reformer 31 disposed at the downstream side of the water flow, thereby enabling the water to be utilized in the reformer 31. In FIG. 11, numeral 31 indicates a fuel gas to be reformed by the reformer 31.

Although unreacted gas is employed in this embodiment, it is also possible to employ part of the gas for the heating of a vehicle.

According to the polymer electrolyte fuel cells system of this embodiment which is constructed as explained above, since water vapor is caused to be condensed into water in the porous body 35 and the water thus condensed permeates through the porous body 35 to reach the unreacted gas side, the surface of the porous body 35 facing the unreacted gas side is turned into a wet state, thus maximizing the difference in partial pressure of water vapor. As a result, the unreacted gas is humidified. Further, the water failed to be absorbed as steam by the unreacted gas is utilized as a water for the reforming in the reformer 31 that is disposed on a downstream side of the humidifying section.

According to the polymer electrolyte fuel cells system of this embodiment which is constructed as explained above, since the water vapor contained in the reacted gas can be effectively transferred to the unreacted gas, a water-feeding passageway for humidification is no more required to be provided, so that the problem of freezing can be obviated even when the system is employed at a very cold temperature.

Furthermore, since water contained in the reacted gas is removed, the freezing of discharging line of the reacted gas due to a residual water can be prevented, and at the same time, part of unreacted gas can be utilized as an internal air inside a vehicle for the purpose of heating the interior of the vehicle in the winter season, thus making it possible to improve the efficiency of the system.

Additionally, the water thus condensed can be utilized for the steam reforming of the reformer 31, thus dispensing with the employment of a water tank for reforming and hence, making it possible to enable the system to become more compact.

As explained above, according to the polymer electrolyte fuel cells system of this embodiment, since the reacted gas is contacted through a water retentive porous body with the unreacted gas, the water contained in the reacted gas can be effectively transferred to the unreacted gas. As a result, even if an unreacted gas of low relative humidity is fed to the cell stack, the diffusion resistance of the water vapor can be minimized, thus making it possible to transfer as much quantity of water as possible toward the unreacted gas side, thus enabling to sufficiently humidify the unreacted gas. As a result, even if the system is operated using an unreacted gas of non-humidified state, the power generation can be ensured without lowering the cell temperature.

As explained above, since a humidifier employing water is no more required to be used, the problem of freezing can be obviated even if the ambient temperature is lowered to 0° C. or less. Therefore, since a process of melting a frozen water can be dispensed with, a fuel cell can be actuated within a shorter time and in a simple procedure.

Moreover, since the system can be simplified and made more compact, and at the same time, since the system can be operated at a higher temperature as compared with the cell temperature to be employed where a non-humidified gas is fed to the system according to the prior art, the lowering of voltage due to the effect of CO can be inhibited, thus making it possible to obtain a polymer electrolyte fuel cells system which is excellent in performance and compact in size.

Additional advantages and modifications will readily occur to those skilled in the art. Therefore, the invention in its broader aspects is not limited to the specific details and representative embodiments shown and described herein. Accordingly, various modifications may be made without departing from the spirit or scope of the general inventive concept as defined by the appended claims and their equivalents.

What is claimed is:

1. A polymer electrolyte fuel cells system comprising:
   a cell stack constituted by a stacked body of a plurality of cells each having a solid polymer electrolyte membrane; and
   a temperature/humidity exchanger and a water retentive-porous body, which enables a first gas passed through said cell stack to condense at one surface of the water retentive-porous body, with the condensate thereby produced transferred through the porous body and evaporated at another surface of the water retentive-porous body to contact with a second gas to be passed through said cell stack, and
   the temperature of said second gas in an inlet of said temperature/humidity exchanger is lower than the temperature of said first gas in the inlet of said temperature/humidity exchanger.

2. The polymer electrolyte fuel cells system according to claim 1, wherein said temperature/humidity exchanger comprises gas channels so as to cause the first gas and the second gas to take a counterflow to each other with the porous body being interposed therebetween.

3. The polymer electrolyte fuel cells system according to claim 1, wherein said temperature/humidity exchanger is provided with cooling means for cooling the porous body.

4. The polymer electrolyte fuel cells system according to claim 1, wherein said temperature/humidity exchanger is disposed to contact with the cell stack.

5. A polymer electrolyte fuel cells system comprising:
   a main cell body composed of a cell stack constituted by a stacked body comprising a plurality of cells each having a pair of gas diffusion electrodes consisting of a fuel electrode and an oxidizing electrode, and a solid polymer electrolyte membrane, said cells being stacked with separators and cooling plates being selectively interposed therebetween,
   wherein each of said separators includes reactant channels which enable two reactants to take a counter flow with respect to each other; and
   wherein each of said gas diffusion electrodes has a hydrophilized portion provided at a downstream portion in the flow of the gases.

6. The polymer electrolyte fuel cells system according to claim 5,
   wherein each of said cooling plates includes a coolant flow groove, the coolant upstream side of said flow groove being disposed at inlet/outlet portions of the reactant channels in said separator.

7. The polymer electrolyte fuel cells system according to claim 5, wherein each of said cooling plates includes coolant flow grooves, and intervals between flow grooves located at inlet/outlet portions of the reactant channels in said separator are made narrower than intervals between the coolant flow grooves that are located other than the inlet/outlet portions of the reactant channels in said separator.

8. The polymer electrolyte fuel cells system according to claim 5, wherein each of said separators further includes:

reactant channels which enable two reactants to take a counter flow with respect to each other; and cooling means for radiating heat to outer atmosphere, said cooling means being located at inlet/outlet portions of the reactant channels in said separator.

9. The polymer electrolyte fuel cells system according to claim 5, wherein said hydrophilization is effected by an impregnation of said downstream portion with at least one kind of a fine powder selected from the group consisting of carbon, SiC, $SiO_2$, $TiO_2$ and $SnO_2$ powders.

10. The polymer electrolyte fuel cells system according to claim 5, wherein said hydrophilization is effected by an impregnation of said downstream portion with a solid polymer electrolyte solution.

11. The polymer electrolyte fuel cells system according to claim 5, wherein said hydrophilization is effected by a press-fitting of a solid polymer electrolyte membrane into said downstream portion.

12. A polymer electrolyte fuel cells system comprising:

a main cell body composed of a cell stack constituted by a stacked body comprising a plurality of cells each having a pair of gas diffusion electrodes consisting of a fuel electrode and an oxidizing electrode, and a solid polymer electrolyte membrane, said cells being stacked with separators and cooling plates being selectively interposed therebetween;

each of said separators comprising reactant channels which enable two reactants to take a counter flow in a manner to face each other; and catalyst layers provided at the pair of gas diffusion electrodes excluding downstream portions of the entire passageways of the channels.

13. The polymer electrolyte fuel cells system according to claim 12, wherein at least a portion of said fuel electrode which faces the catalyst layer of the oxidizing electrode among said pair of gas diffusion electrodes is provided with the catalyst layer.

14. A polymer electrolyte fuel cells system comprising:

a main cell body composed of a cell stack constituted by a laminated body of a plurality of cells each having a solid polymer electrolyte membrane;

said main cell body comprising temperature/humidity exchange means which enables a first gas passed through said cell stack to be contacted, through a water retentive-porous body, with a second gas to be passed through said cell stack; and means attached to said porous body, for condensing water vapor contained in the first gas.

* * * * *